United States Patent [19]

Hamblen et al.

[11] Patent Number: 5,040,961
[45] Date of Patent: Aug. 20, 1991

[54] APPARATUS FOR MANUFACTURING ASPHERICALLY SHAPED SMALL LENSES

[75] Inventors: David P. Hamblen, Rochester; Sharma Ravi, Penfield, both of N.Y.

[73] Assignee: Eastman Kodak Company, Rochester, N.Y.

[21] Appl. No.: 417,980

[22] Filed: Oct. 4, 1989

[51] Int. Cl.[5] .............................................. B29C 41/36
[52] U.S. Cl. ...................................... 425/6; 264/1.1; 264/5; 425/808; 425/174
[58] Field of Search .................. 425/3, 808, 275, 809, 425/811, 174, 5, 6; 264/1.1, 2.1, 275, 2.2, 276, 278, 4, 5, 13, 15; 249/74, 136, 139

[56] References Cited

U.S. PATENT DOCUMENTS

| | | | |
|---|---|---|---|
| 2,205,837 | 6/1940 | Ravenscroff et al. | 425/5 |
| 2,275,154 | 3/1942 | Merrill et al. | 425/5 |
| 2,861,911 | 11/1958 | Martin et al. | 425/811 |
| 2,919,471 | 1/1960 | Hechinger | 264/13 |
| 3,160,686 | 12/1964 | Doyle et al. | 425/5 |
| 3,361,858 | 1/1968 | Wichterle | 425/808 |
| 3,418,978 | 12/1968 | Wise et al. | 425/808 |
| 3,452,121 | 6/1969 | Cochardt et al. | 425/3 |
| 3,841,598 | 10/1974 | Grucza | 249/136 |
| 3,955,015 | 5/1976 | Ohtsuka et al. | 427/163 |
| 4,022,855 | 5/1977 | Hamblen | 264/1 |
| 4,303,431 | 12/1981 | Torobin | 264/5 |
| 4,338,352 | 7/1982 | Bear et al. | 427/8 |
| 4,478,770 | 10/1984 | Vofsi et al. | 264/2.1 |
| 4,514,053 | 4/1985 | Borrelli et al. | 350/162.2 |
| 4,689,291 | 8/1987 | Popovic et al. | 430/321 |
| 4,784,811 | 11/1988 | Hirschfield | 264/1.5 |
| 4,786,444 | 11/1988 | Hwang | 264/2.2 |
| 4,944,584 | 7/1990 | Maeda et al. | 264/1.7 |

FOREIGN PATENT DOCUMENTS 1055267  1/1967  United Kingdom .

OTHER PUBLICATIONS

Applied Optics, 4/1/88, vol. 27, No. 7, p. 1281 et seq., "Technique for Monolithic Fabrication of Microlens Arrays", by Popovic et al.
Applied Optics, 10/1/82, vol. 21, No. 19, p. 3456 et seq., "Stacked Planar Optics: An Application of the Planar Microlens", Kenichi Iga et al.

Primary Examiner—Jay H. Woo
Assistant Examiner—Matney, Jr. William J.
Attorney, Agent, or Firm—John B. Turner

[57] ABSTRACT

Apparatus for the manufacture of individual small lenses, which may have gradient indices of refraction. The apparatus includes a pedestal having a conduit therein and an end surface the perimeter of which may be circular or elliptical. The perimeter is defined by a sharp edge. The pedestal is supported with the end surface horizontal and facing downwards. The intersection of the conduit and the surface, also defined by a sharp edge, forms an orifice through which at least one of the liquid monomers for forming the lens is fed. Gradient index small lenses are formed by suspending a first monomer from the horizontal end surface of the pedestal and then, via the orifice, introducing the second monomer at a rate which equals the rate of inter-diffusion of the second monomer into the first monomer. Alternatively, both monomers are both fed, in mixed condition, through the orifice in continuously varying proportions. The monomer(s) are cured in the pendant condition. The gradient index small lenses so formed are aspherical and, in the case of an elliptical pedestal end surface, also anamorphic.

19 Claims, 3 Drawing Sheets

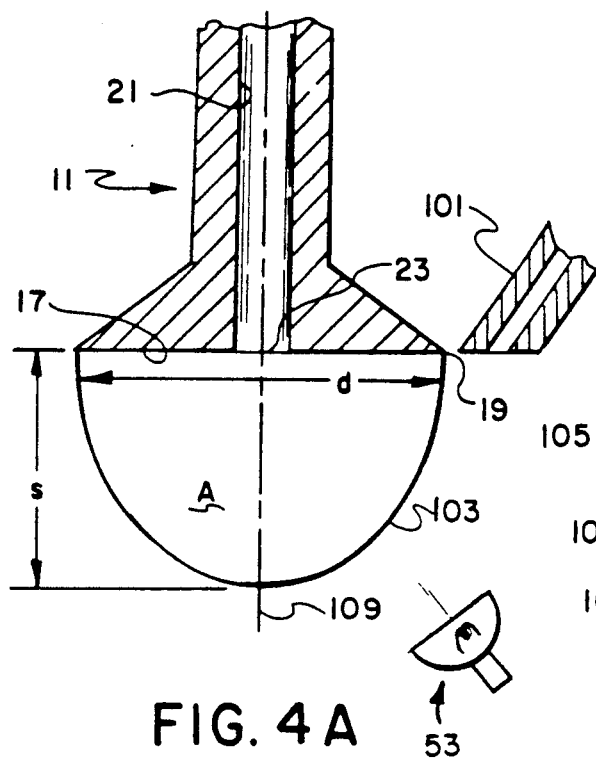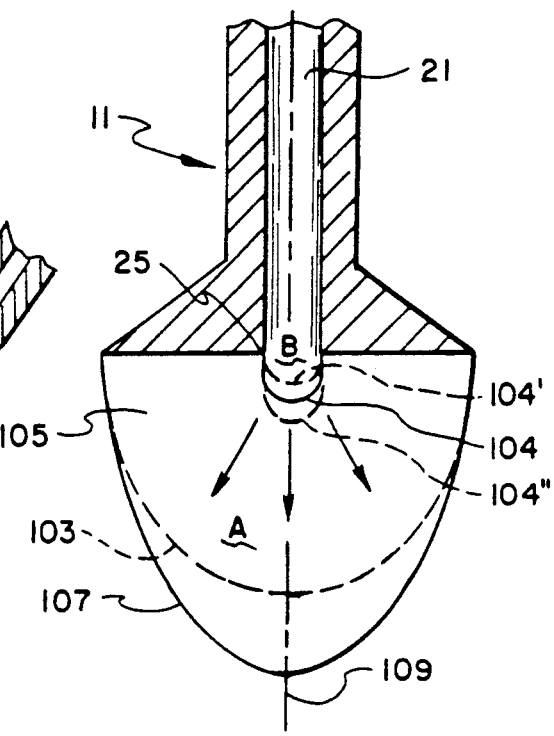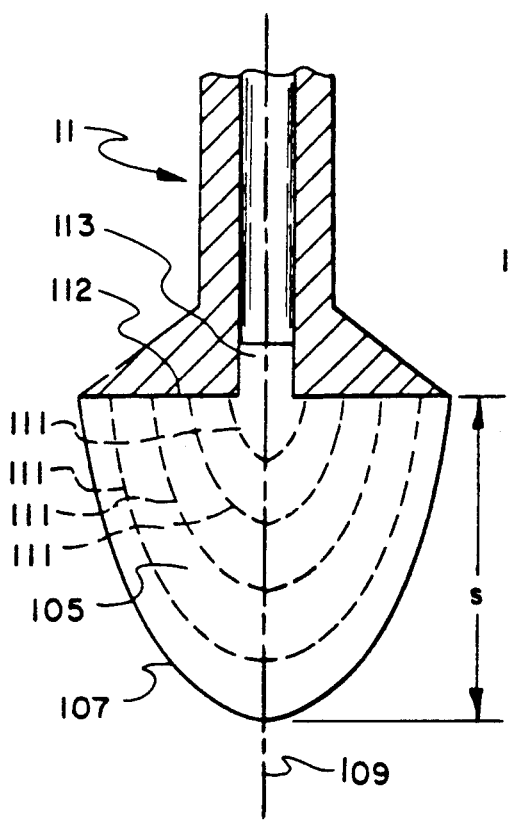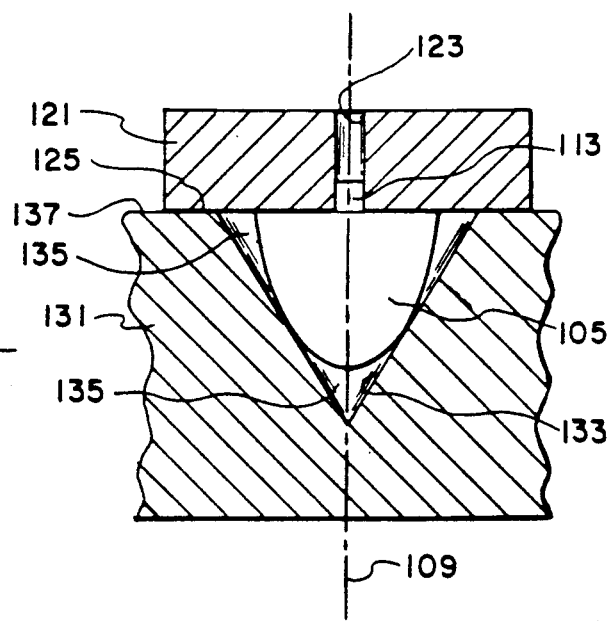

APPARATUS FOR MANUFACTURING ASPHERICALLY SHAPED SMALL LENSES

FIELD OF THE INVENTION

This invention relates to apparatus for the fabrication of small lenses and, in some aspects, to methods and apparatus for fabricating small lenses having both an aspheric shape and a gradient index of refraction.

BACKGROUND OF THE INVENTION

Micro-optic lenses, often called microlenses, are, generally speaking, small, short focal length lenses which have numerous uses in the opto-electronics field. The term "microlens" covers both the 30 $\mu$m microscopic lenses disclosed in U.S. Pat. No. 4,689,291 to Z. D. Popovic et. al. as well as larger but still small, such as 4 mm ($4 \times 10^3$ $\mu$m) diameter, lenses which may be manufactured by apparatus and methods in accordance with the present invention. Applications for such lenses include optical couplings for fiber optics, collecting the light emitted from an LED or laser diode, focusing light on solid state photodetectors, use in integrated optical couplers/decouplers, and objective lenses for optical disk and CD players.

These and other miniaturized opto-electronic devices have created a demand for microlenses and microlens arrays, and substantial effort and expense have been devoted to the development of such lenses. Depending on their size, microlenses and microlens arrays can be molded by replicating the contours of precisely machined dies.

Microlenses can also be formed by producing a gradient index lenslet in a substrate, which may be of glass, plastic, organic/inorganic composition or sol-gel. Localized index changes are produced by diffusion of mono valent ions (Ag+, Tl+), or low molecular weight monomers, or by ion implantation. In all these processes, a metal mask having small circular openings is first placed over the chosen substrate by a process of metalizing one substrate surface, then using photolithography to make an array of openings with equal spacing between centers. Ion exchange through the small circular openings changes the localized index of refraction via binary diffusion to build an index distribution with iso-index contours that are spherical in shape (i.e. lens shaped). The index change is largest at the opening and decreases radially outward to that of the substrate. Ion exchange or diffusion can be also made in a sol-gel or organic/inorganic composite substrate. By a second method, the exchange between a monomer and partially polymerized polymer host substrate of differing refractive index can build a micro lens array. Final thermal polymerization gives a rigid array of lenslets. In a third method, high energy ion implantation, through circular openings in a metalized mask, of such elements as Pb+, Au+, etc., followed by thermal diffusion, can give the requisite index change and lens shaped contour. Through thermal treatment of the ion implanted substrate, atomic diffusion develops a spherical lens shape which extends under the mask opening. It is claimed that microlenses can be made aspherical shaped through an electrical bias on the substrate during the process of forming such microlenses, to enhance their focal properties. The effects of such electrical bias are believed to be rather limited.

U.S. Pat. No. 4,514,053 to H. F. Borrelli et. al. discloses an integral optical device that is composed of a photosensitive glass having an optical pattern developed therein by a refractive index change due to formation of colloidal metal particles and/or crystalline microphases nucleated by such particles. In a specific embodiment the pattern is composed of at least one transparent lens system having a radial gradient refractive index distribution.

U.S. Pat. No. 4,689,291 entitled Pedestal-Type Microlens Fabrication Process, Z. D. Popovic et. al., discloses the formation of non-gradient microlenses and microlens arrays on opto-electronic devices and other substrates by using "sharp" (approximately 90°) edge pedestals to confine the lateral flow of molten lens material. The process for the production of such microlenses includes the steps of: (a) depositing a thin, optically opaque material, such as an aluminum film, on the desired substrate, such as quartz; (b) photolithographically patterning the aluminum film with an array of precisely dimensioned apertures, which form stops for the microlenses; (c) forming circular sharp edged pedestals, also using photolithography techniques, on top of the aperture stops formed in the aluminum film; (d) forming, on top of the pedestals and also by conventional photolithography techniques, cylinders of photoresist; and (e) melting the photoresist to form the lenslets. The cylinder of photoresist is smaller in diameter than the diameter of the pedestal and positioned on the pedestal so that there is adequate clearance between the respective outer circumferences to prevent the formation of unwanted drip paths that would allow the photoresist to spill over the pedestal edges. During the melting step the molten photoresist wets the pedestals, while the pedestals remain hard, so that the photoresist spreads laterally thereacross. The "sharp" edges of the pedestals "effectively confine the flow, thereby preventing the molten photoresist from spreading therebeyond." The inherent surface tension of the photoresist, while in its molten state, causes the microlens so formed to have what is stated to be "substantially constant radii". The patent also states that: "Gravitational force may tend to deform the microlenses . . . if they are too large, but no significant gravitational deformation occurs if the internal pressure of the molten photoresist is much greater than the gravitational pressure." Non-hemispherical microlenses may be fabricated by the use of elliptically shaped pedestals. In an article entitled "Technique for monolithic fabrication of microlens arrays", also by Z. D. Popovic et. al., Applied Optics, Apr. 1, 1988, the authors disclose an example wherein the resulting lenslets have a diameter of 30 $\mu$m and a thickness of 12 $\mu$m.

The above described process has several limitations/disadvantages. The microlenses produced are limited to micron size lenslets; the lenslet materials are soft and not scratch resistant; the lenslets are less than hemispherical and, therefore, have long focal lengths (i.e., focal lengths that are many times the thickness of the lenslets); the lenslets produced do not have gradient index profiles and the process does not lend itself to the use of gradient index materials; and the lenslets produced are not aspherical.

My prior U.S. Pat. No. 4,022,855 discloses a method and apparatus for making plastic optical elements having a gradient index of refraction. The method involves introducing first and second monomers, each having a different index of refraction, into a centrifugal mold in accordance with a controlled procedure to produce a lens which has a continuous gradient in refractive index extending in a direction radially outward from the rotational axis of the centrifugal mold. The apparatus includes a means to continuously vary the volumetric ratio of the two monomers as the mold is filled.

SUMMARY OF THE INVENTION

This invention relates to apparatus and methods for the manufacture of small lenses having an aspherical shape and, in some embodiments, a gradient index of refraction. The apparatus includes an invertable pedestal having an end surface, which in some embodiments is flat but may be convex or concave, and an outer curvilinear perimeter defined by a first sharp edge. The pedestal may have a conduit therein which is connected to the surface by an orifice, defined by a second sharp edge. The angle within the material of the pedestal between the surfaces joining at the sharp edge, i.e. the included angle, is equal to and, preferably, less than 90 degrees. Typically, the second sharp edge is 90 degrees but, in some instances, is less than 90 degrees. The end surface may be on a sequin of magnetically attracted material, with the remainder of the pedestal made magnetic or of magnetizable material. An alignment collar of non-magnetic material is also provided. For gradient index lenses, one or both lens monomers may be fed through the conduit to form a pendant drop which after curing forms a lens. In the case where both monomers are fed through the stem, separate supply chambers are provided for each monomer, which chambers may be connected, via variable flow rate control valves, to a mixing chamber. The mixing chamber is, in turn, connected to the stem portion.

In the formation of gradient index aspheric lenses, a first drop of monomer, having a first index of refraction, is formed on the pedestal. This step may take place with the pedestal in either its upright or inverted position. Next, with the pedestal in the inverted position, the second monomer, having a second and usually higher index of refraction, is flowed through the orifice at a rate set to balance with the rate of inter-diffusion of the second monomer into the first monomer, such that a gradient index profile is developed. After the inter-diffusion has gone to a desired extent, the lens is cured. When the mixing chamber is used, inter-diffusion is replaced by the mixing of the first and second monomers in this chamber. The initial flow from the chamber to the pedestal end surface may be the first, lower index monomer, or a combination of both monomers. The second, higher index monomer is added at a predetermined rate so that the ratio of first to second monomer constantly decreases; the final flow may be the second monomer only.

When only one monomer is used, the conduit and orifice may, in some embodiments, be eliminated. The lenses produced are aspherical, but do not have a gradient index of refraction.

When the pedestal end surface has a circular perimeter, the resulting lenses are aspherical. When the pedestal surface has an elliptical surface the resultant lenses are both anamorphic and aspherical.

BRIEF DESCRIPTION OF THE DRAWINGS

Embodiments of the present invention will now be described, by way of example, with reference to the accompanying drawings, in which:

FIGS. 4A, 4B, 4C and 4D illustrate process of manufacturing a lens using the pedestal of FIG. 1, according to the present invention, FIG. 4D being on a smaller scale than FIGS. 4A-C;

DETAILED DESCRIPTION

Figure 1:
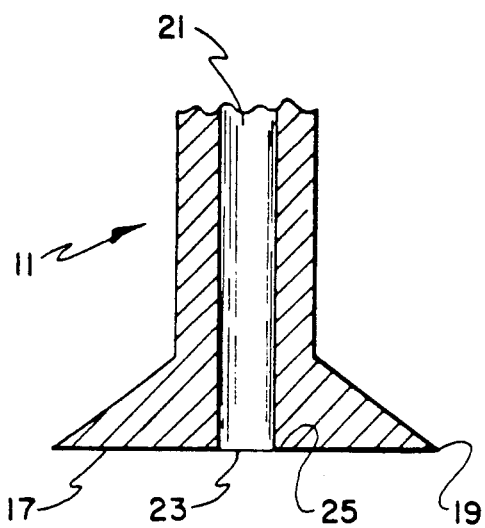
FIG. 1 is a cross-sectional view of one form of the pedestal used for making lenses, according to the present invention.

With reference to FIG. 1, apparatus for forming small lenses according to the present invention includes pedestal 11 having an end surface 17 bounded by an outer curvilinear perimeter defined by sharp edge 19. As illustrated, surface 17 is flat because the lens to be produced has a plano surface. However, the surface 17 may also be either concave or convex, if convex or concave, respectively, lens surfaces are advantageous for optimized optical imaging. The pedestal 11 has a conduit 21 which terminates at the surface 17. The intersection of conduit 21 and the surface 17 forms an orifice 23 having a continuous sharp edge 25. The center of the orifice is coincident with the geometric center of the end surface 17. The upper end of conduit 21 is connected, via tubing not illustrated, to monomer feeding apparatus such as a Sage Instruments Model 355 syringe pump (not shown), or a computer controlled syringe pump (also not shown). The purpose of the feeding apparatus is to feed one or two monomers through conduit 21 at a carefully controlled rate or rates. Typically, pedestal 11 is made of metal, such as cold rolled steel or titanium, which facilitates the machining of sharp edges.

Figure 5:
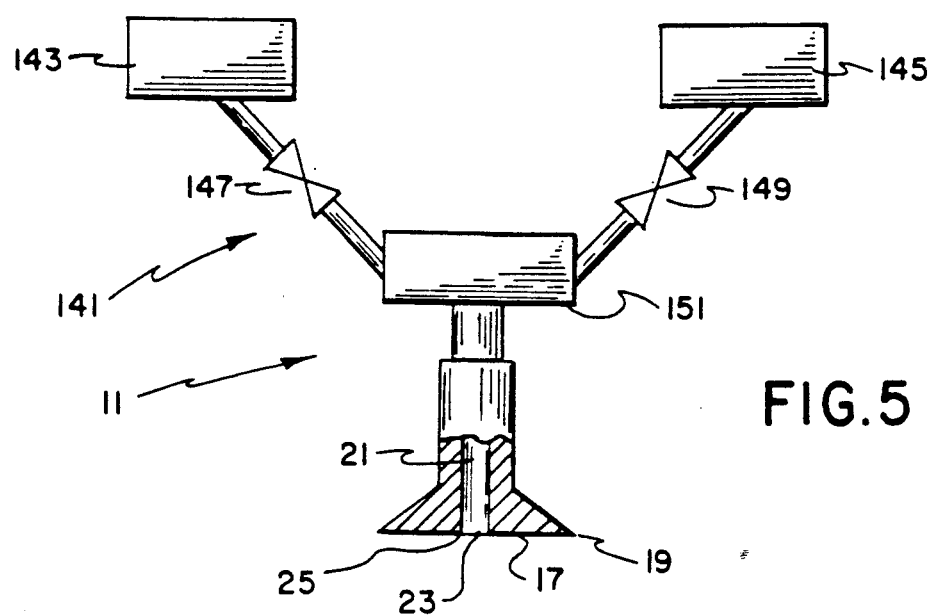
FIG. 5 is a side view partially cross-sectional and partially schematic view of a second embodiment of apparatus in accordance with the present invention, including the pedestal of FIG. 1.

The pedestal 11 can be supported with the end surface 17 horizontal and facing downwards by any convenient support means such as that schematically represented in FIG. 5 but omitted in other figures.

Figure 2:
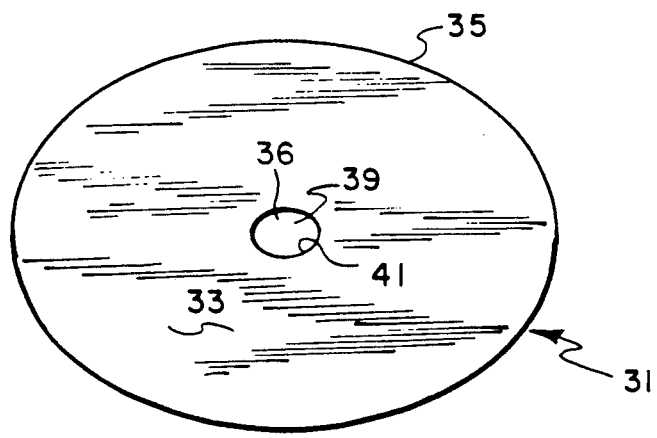
FIG. 2 is an end view of an alternate form of the pedestal according to the present invention.

For the production of aspheric gradient refractive index small lenses having a circular base, the perimeter defined by edge 19 is circular. The orifice 23 also is circular. With reference to FIG. 2, if gradient lenses which are both anamorphic and aspherical are desired, a pedestal 31 having an elliptical face 33, defined by an elliptical sharp edge 35, is used. The pedestal 31 has a conduit 36 which, at its intersection with face 33, forms an elliptically shaped orifice 39 having a continuous sharp edge 41. An anamorphic lens produced with pedestal 31 has, as is well known, the advantage of giving different refractive power through different azimuths.

In both the embodiments illustrated in FIGS. 1 and 2, sharp edges 19 and 35 are, in cross-section, 45° or less. By the term "are, in cross-section, 45°" is meant that the angle within the material of the pedestal, bounded by the surfaces which intersect at the sharp edge, is 45°. Theoretically, a sharp edge which has a 90° cross section is just as effective as a 45° edge. In practice specifying an angle less than 90° helps ensure that the machining process results in a sharp edge.

Figure 3:
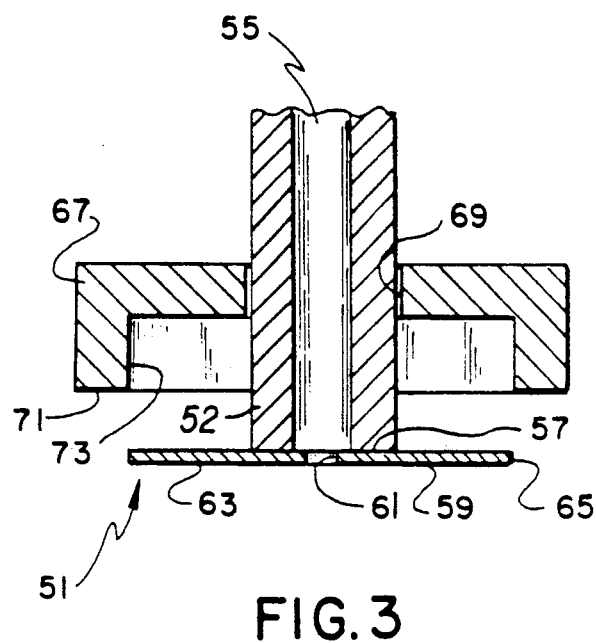
FIG. 3 is a cross-sectional view of a third pedestal used for making lenses according to the present invention.

With reference to FIG. 3, another form of pedestal 51 is shown which has a conduit 55 therein and a flat end 57. Stem 52 is made of material which is either magnetized or magnetizable by electric current. Magnetizable material is preferred. Pedestal 51 also includes a sequin 59, made of magnetically attracted metal. A sequin, as is known, is a plano laminar object having an aperture at its middle. The sequin 59 is held against the stem portion 53 by magnetic forces. The sequin 59 has a sharp edged orifice 61 of the desired shape and diameter. The curvilinear perimeter of exposed surface 63 of the sequin is defined by a sharp edge 65. Sequin is approximately 300 $\mu$m thick, and edge 65 has a cross section of approximately 90°. To align the sequin 59 on the stem 53, that is, to align the orifice 61 with the conduit 55, a non-magnetic alignment collar 67 is provided. The collar 67 has a circular opening 69, in which is closely but slidably received stem 53, and an outer cylindrical projection 71, having an interior surface 73 which closely fits around edge 65 to align sequin 59. The use of a sequin to provide the end surface is an easy way to make a sharp edge, aids in the removal of the microlens, and permits one to change orifice sizes and/or end surface shapes without changing the major portion of the pedestal.

Reference is now made to FIGS. 4A–4D, in which a process for producing an aspherically shaped gradient index small lens using pedestal 11, in accordance with the present invention, is illustrated. The first step is to wick onto surface 17 with a syringe 101, or other suitable delivery mechanism, a metered drop of liquid monomer A suitable for forming a lens and having a relatively low index of refraction $N_A$. In the inverted position illustrated in FIG. 4A, the pedestal 11 being supported by support means with the surface 17 horizontal, monomer A is held onto surface 17 by surface tension. Because of surface tension, sharp edge 19 causes the monomer A to form a droplet on surface 17 with a lens shaped monomer to ambient atmosphere surface 103, bounded by the edge and whose diameter d is equal to that of surface 17. Gravitational forces elongate the droplet to form an aspherical surface with an aspect ratio AR defined as $$AR = s/d$$

where s is the lens thickness (sagitta). For a hemispherical lens, $AR = 0.5$. For lenses according to the present invention, $AR > 0.5$.

The droplet of monomer A could now be cured, as by the ultraviolet source 53 schematically represented in FIG. 4A, and a non gradient refractive index (i.e. homogenous) aspheric lens would be formed.

A gradient index lens is formed when a second monomer B, having an index of refraction $N_B > N_A$, is slowly flowed into monomer A through conduit 21 and orifice 23, as illustrated in FIG. 4B while the pedestal is so held by the support means that the surface 17 is horizontal. Sharp edge 25, the surface tension of monomer B and control of the feed rate ensure that monomer B is confined to a droplet, as indicated by line 104 in FIG. 4B which also defines the interface between the two monomers, having a diameter, in a horizontal plane, equal to the diameter of orifice 23. Coating surface 17 to make it non-wettable also helps to confine droplet 104. The feed rate will also affect the thickness of droplet 104, as indicated by dotted lines 104' and 104". To ensure that a spherical gradient index surface is built, the feed rate of monomer B, controlled by the syringe pump, is set to balance the inter-diffusion of the two monomers. Also, with reference to FIG. 4B, it will be seen that, with the addition of monomer B, the thickness increases in direct proportion to the amount of monomer B added, while sharp edge 19 ensures that the diameter d does not change. The final body 105 of inter-diffused monomers has a profile which is indicated by surface 107.

Inter-diffusion of the two monomers produces a series of iso-index imaginary surfaces 111, as illustrated schematically in FIG. 4C. With $N_B > N_A$ that portion of lens 105 nearest orifice 23 has the highest refractive index, while surface 107 has the lowest.

If imaging quality is enhanced by $N_A > N_B$, then the pendant drop consists of the high index monomer $N_A$ and the low index monomer $N_B$ is flowed through the conduit 21.

Once the inter-diffusion of the two monomers has reached the desired state, the lens is cured, in the present embodiment with UV radiation. Of course, if inter-diffusion were allowed to occur for an indefinite time, a homogeneous body would be created. Thus, inter-diffusion may be terminated, for example, when the second monomer has just reached the surface of the first monomer. Depending upon the monomers used and the curing time desired, heat may also be used in the process. The curing is carried on for a time sufficient to also harden some of the monomer remaining in conduit 21. The shape of the solid lens produced by curing the inter-diffused liquid monomers differs somewhat from the shape of the surface 107 of the liquid monomers, due to shrinkage caused by curing, and this fact has to be taken into account in manufacturing a lens of desired imaging characteristics.

After curing, lens 105, having a curved surface 107, axis 109, a plano back surface 112 and a post 113 is removed from pedestal 11. To aid in removal, surface 17 can be coated with a bake hardened polymer which is non stickable to the cured lens material.

While surface 107 needs no grinding and/or polishing, back surface 112 must be polished to remove post 113. With reference to FIG. 4D, lens 105 is inserted in a centering form 121, having an opening 123, which is perpendicular to surface 125, and which snugly receives post 113. After being placed in form 121, lens 105 is then inserted in polishing form 131 having a cone shaped opening 133 therein to receive surface 107. Wax 135 ensures that the axes 109 of lens 105 remains perpendicular to surface 137 so that when centering form 121 is removed and surface 112 is polished (by conventional methods), it remains perpendicular to lens axis 109.

As those skilled in the art will appreciate, in the manufacture of lenses with, for instance, pedestal 11, there are a number of variables, particularly: the miscibility of the two monomers selected and their ability for copolymerizing; the respective indices of refraction of the two monomers; the surface tension between monomer A and surface 17; the diameter of conduit 21; the flow rate of monomer B through conduit 21; the final volumetric ratio of monomer A to monomer B; the diffusion rate of monomer B into monomer A; and the type and duration of the curing. With reference to Table 1, lenses have been made with the following materials:

TABLE I

| Monomer A | $N_A$ | Monomer B | $N_B$ |
|---|---|---|---|
| NOA #68 | 1.54 | NOA #81 | 1.56 |
| NOA #65 | 1.524 | NOA #60 | 1.56 |
| Dymax #415 | 1.48 | NOA #60 | 1.56 |

TABLE I-continued

| Monomer A | $N_A$ | Monomer B | $N_B$ |
|---|---|---|---|
| CR 39 | 1.50 | NOA #60 | 1.56 |
| CR 39 | 1.50 | HIRI | 1.565 |
| CR 39 | 1.50 | DIP | 1.57 |
| PETA | 1.48 | HIRI | 1.565 |
| Dymax #305 | 1.48 | Dymax #304 | 1.53 |
| Dymax #305 | 1.48 | Dymax #456 | 1.52 |

PETA is penta erythritol triacrylate; DIP, diallyl isophthalate manufactured by Polysciences, Inc., Warrington, Pa.; CR 39, diethylene glycol bis(allyl carbonate); HIRI a proprietary mixture of the carbonate ester family manufactured/supplied by PPG Industries, Pittsburgh, Pa.; NOA 60, 65, 68, and 81 proprietary formulations of Norland Products, Inc., New Brunswick, N.J.; and Dymax 304, 305, 415 and 456, proprietary formulations of American Chemical & Engineering Co., Inc., Torrington, Conn.

Aspect ratios ranging from AR=0.55 to 0.82 have been obtained. For any given d, the limit of s and, hence, AR is the point at which the surface tensional force of monomer A is overcome by the weight of monomer B and gravity. Also, the upper limit on d, i.e. the maximum diameter of the lens, is determined by the maximum weight of monomers which can hang on and not detach from the pedestal. The lower limit on d is determined by the smallest diameter of orifice which can pass monomer and the smallest pedestal and pedestal end surface which can be made. Thus, the term "small lenses" is intended to embrace all lenses having diameters within the upper and lower limits. Such limits vary with differed monomers, different materials of the pedestal end face and other parameters.

With reference to FIG. 5, pedestal 11 is shown connected to apparatus 141 for metering both monomer A and B through conduit 21, orifice 23 and onto surface 17 and for supporting the pedestal with its end surface 17 horizontal and downwardly facing. Surface 17 is wet by both monomers A and B after they override edge 25. Apparatus 141 includes a supply chamber 143 for monomer A and a supply chamber 145 for monomer B. Variable flow rate control valves 147 and 149, which are computer controlled, allow a polymerization mixture of the two monomers to flow under pressure (supplied by any conventional source or sources such as syringe pumps, not shown) at predetermined rates, which vary in relative proportion over the filling period, into mixing chamber 151 which is connected to conduit 21. Instead of the inter-diffusion process described with reference to FIGS. 4A-4D, the mixing of the monomers A and B takes place in chamber 151. The initial flow out of chamber 151 and through orifice 23 may be monomer A alone or a combination of both monomers; in either event, monomer B is added so that the ratio of A to B continuously decreases at a predetermined rate; the final flow may be monomer B only. This process is faster than the one illustrated in FIGS. 4A-D.

In the immediately preceeding example, use of a high enough feed rate through conduit 21 ensures that the monomers override edge 25 and spread across surface 17 to edge 19. However, if surface 17 is provided with one or more concentric sharp edged grooves (not shown; which may project from or be cut into surface 17) the spread across surface 17 can be stopped short of edge 19 and the surface bounded by the sharp edged groove at which monomer spread stops is then the effective end surface. Control of the feed rate will determine whether the monomer or monomers override a particular groove.

Figure 6:
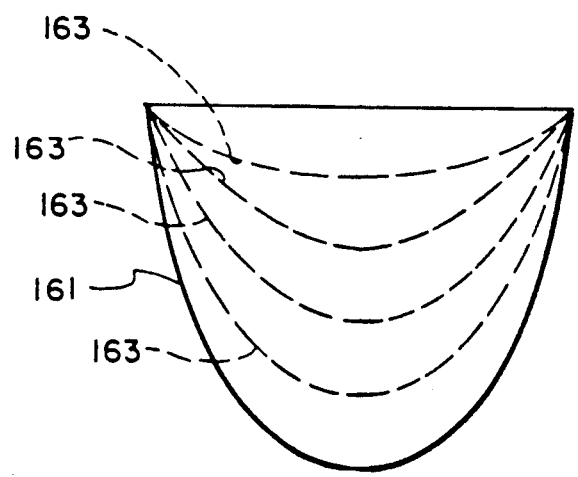
FIG. 6 is a side view of a lens manufactured with the apparatus of FIG. 5.
Figure 7:
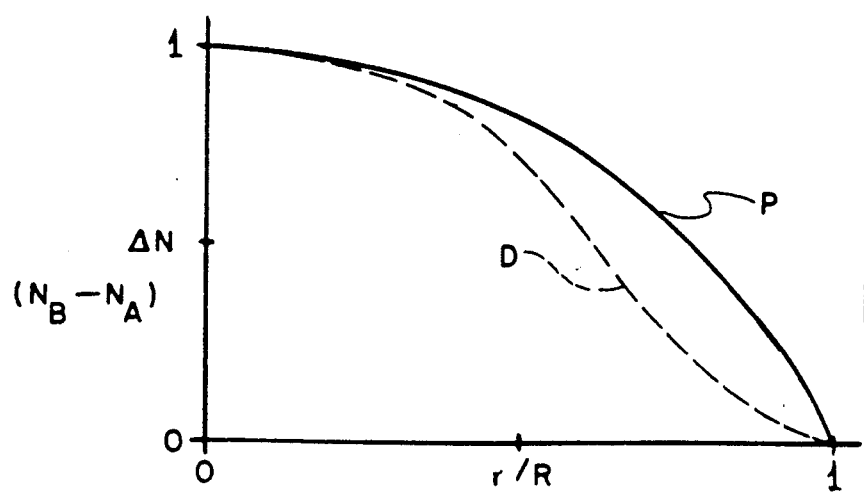
FIG. 7 is a graph comparing the gradient index profile of a lens made by the process illustrated in FIG. 4 with the gradient index profile of a lens made by the process illustrated in FIG. 5.

The iso index curves of lens 161, formed with the apparatus of FIG. 5, are indicated by broken lines 163 and again represent imaginary surfaces resulting from revolution of the curves 163 about the axis of the lens. The iso index curves of lens 161 are more of an axial gradient, but retain an aspherical index geometry. Further, with reference to FIG. 7, there is better control of the gradient profile of lens 161 in that it is parabolic rather than diffusion shaped. Curve D is the typical shape resulting from diffusion of two monomers. It represents the gradient index profile, illustrated in FIG. 4C, if a cross section were taken anywhere across iso-index contours 111. Parabolic curve P represents the gradient index profile, illustrated in FIG. 6, if a cross section were taken anywhere across iso-index contours 163. In FIG. 7, $\Delta N$ represents the relative proportions of $N_B$ to $N_A$; and r/R, the ratio of any intermediate radius to the outside radius of the lens.

There are several advantages to the lenses produced by the above described pedestals and methods. First, gradient index small lenses produced have a large aspect ratio (AR>0.5) which has greater focusing properties for marginal (off axis) rays than non gradient index prior art small lenses. Such lenses correct off axis aberrations as well as spherical aberrations. The processes produce lenses in which the curved surface (e.g., surfaces 107 and 161) has the maximum optical surface quality, it having been formed by surface tension at an interface of liquid to air rather than of liquid to a mold surface. Except for removal of the post, no grinding or polishing is required. The high aspect ratio allows more convergence of the peripheral rays to a common focal point and hence the lens has a smaller f number. Further, the processes produce individual, stand-alone lenses, rather than an array of lenslets. Finally, in the case of anamorphic lenses, the different power in different azimuths permits the circularization of a beam of light having an elliptical cross section, such as produced by a laser diode.

While the shape of the aspheric surface of the lens produced by apparatus and methods in accordance with the present invention is not readily controllable, in order to achieve desired imaging properties, the gradient distribution can be controlled, within limits of materials, and the shape of the lower surface of the pedestal can be selected.

Whereas the drawings and accompanying description have shown and described the preferred embodiments of the present invention, it will be apparent to those skilled in the art that various changes may be made in the form of the invention without affecting the scope thereof. For instance, pedestal 11, with or without conduit 21 and orifice 23, can be used to form homogeneous (i.e. non-gradient refractive index) aspheric lenses from only one lens monomer. Also, monomer A could be placed on surface 17 before pedestal 11 is inverted.

What we claim is:

1. Apparatus for the manufacture of small lenses, each having an aspheric surface, from liquid monomer, including:

a pedestal having an end surface having a perimeter formed by a sharp edge;

means for supporting said pedestal with said end surface horizontal and facing downwards; and means for applying a drop of liquid monomer to said end surface;

said sharp edge being adapted, by virtue of surface tension in the liquid monomer, to form a boundary of the free aspheric liquid monomer-to-ambient atmosphere surface of the drop.

2. Apparatus as claimed in claim 1, wherein said means for applying a drop of monomer to said end surface includes a conduit in the pedestal intersecting said end surface at an orifice.

3. Apparatus as claimed in claim 1 or 2, including means for curing the monomer.

4. Apparatus as claimed in claim 2 for the manufacture of small lenses having an aspheric surface and gradient index of refraction from two liquid monomers, including a mixing chamber, means for feeding the two monomers at individually selectable rates to said mixing chamber and thence to said conduit.

5. Apparatus as claimed in claim 4, including means for curing the monomers.

6. Apparatus for the manufacture of small lenses, each having an aspheric surface and gradient index of refraction, from two liquid monomers, including:
a pedestal having an end surface having a perimeter formed by a sharp edge;
means for supporting the pedestal with said end surface horizontal and facing downwards;
a conduit in said pedestal intersecting said end surface at an orifice;
means for applying a drop of first monomer to said end surface; and
means for introducing second monomer through said conduit and orifice into a drop of first monomer pendant on said end surface;
said sharp edge being adapted, by virtue of surface tension in the first liquid monomer, to form a boundary of the free aspheric liquid monomer-to-ambient atmosphere surface of the drop.

7. Apparatus as claimed in claim 6, including means for curing the monomers after inter-diffusion.

8. The apparatus as set forth in claim 1 or 6, wherein:
the angle between the end surface and the surface which said end surface intersects at said sharp edge is equal to or less than 90°, measured in the material of the pedestal.

9. The apparatus as set forth in claim 8, wherein said orifice is defined by a second sharp edge.

10. The apparatus as set forth in claim 9, wherein:
the angle between the end surface and the bounding surface of said conduit which intersect at said second sharp edge is 90° measured in the material of the pedestal.

11. The apparatus as set forth in claim 9, wherein said end surface is flat.

12. The apparatus as set forth in claim 9, wherein said end surface is convex.

13. The apparatus as set forth in claim 9, wherein said end surface is concave.

14. The apparatus as set forth in claim 8, wherein said sharp edge is circular.

15. The apparatus as set forth in claim 8, wherein said sharp edge is non circular.

16. The apparatus as set forth in claim 15, wherein said sharp edge is elliptical.

17. The apparatus as set forth in claim 6, wherein:
said pedestal includes a stem and a sequin both formed of magnetic material;
said stem having formed therein said conduit;
said sequin being adapted to be held in operative relationship with said stem to form said end surface of said pedestal and having formed therein an orifice which, when said sequin is mounted in operative relationship with said stem, forms said orifice through which said second monomer is introduced into said first monomer after passage through the conduit.

18. The apparatus as set forth in claim 17, further including an alignment collar, said alignment collar being slidable on said pedestal, said collar also including a curved surface which closely receives the sequin to align the aperture of said sequin with the conduit.

19. The apparatus as set forth in claim 18, wherein said collar is formed of non-magnetic material.

* * * * *

UNITED STATES PATENT AND TRADEMARK OFFICE
CERTIFICATE OF CORRECTION

PATENT NO. : 5,040,961

DATED : August 20, 1991

INVENTOR(S) : David P. Hamblen, et al

It is certified that error appears in the above-identified patent and that said Letters Patent is hereby corrected as shown below:

On title page, item [75] delete "Sharma Ravi" and insert --Ravi Sharma--.

Signed and Sealed this

Thirteenth Day of July, 1993

Attest:

MICHAEL K. KIRK

*Attesting Officer*     Acting Commissioner of Patents and Trademarks